(12) United States Patent
Davies et al.

(10) Patent No.: US 8,077,314 B2
(45) Date of Patent: Dec. 13, 2011

(54) MEASURING A CHARACTERISTIC OF A MULTIMODE OPTICAL FIBER

(75) Inventors: Dylan Davies, Glos (GB); Arthur H. Hartog, Winchester (GB); Graeme Hilton, Southampton (GB); Gareth P. Lees, Romsey (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 351 days.

(21) Appl. No.: 12/241,303

(22) Filed: Sep. 30, 2008

(65) Prior Publication Data

US 2009/0097015 A1 Apr. 16, 2009

Related U.S. Application Data

(60) Provisional application No. 60/979,880, filed on Oct. 15, 2007.

(51) Int. Cl.
*G01N 21/00* (2006.01)
(52) U.S. Cl. ............... 356/344; 385/12; 356/73.1
(58) Field of Classification Search .......... 356/344, 356/73.1; 285/12
See application file for complete search history.

(56) References Cited

U.S. PATENT DOCUMENTS

| | | | | |
|---|---|---|---|---|
| 4,823,166 A | * | 4/1989 | Hartog et al. ............. | 356/44 |
| 5,592,282 A | * | 1/1997 | Hartog ................... | 356/44 |
| 5,765,948 A | * | 6/1998 | Sai ...................... | 374/161 |
| 5,848,204 A | | 12/1998 | Wanser | |
| 5,963,362 A | * | 10/1999 | Fukaishi ................. | 359/341.44 |
| 7,126,680 B2 | | 10/2006 | Yamate et al. | |
| 7,215,416 B2 | | 5/2007 | Yamate et al. | |
| 7,284,903 B2 | | 10/2007 | Hartog | |
| 7,304,725 B2 | | 12/2007 | Hartog et al. | |
| 7,333,681 B2 | | 2/2008 | Murphy | |
| 7,668,411 B2 | | 2/2010 | Davies | |
| 2005/0140966 A1 | | 6/2005 | Yamate et al. | |
| 2006/0209291 A1 | | 9/2006 | Yamate et al. | |
| 2006/0239330 A1 | | 10/2006 | Yamate et al. | |
| 2006/0245468 A1 | * | 11/2006 | Hartog ................... | 374/161 |
| 2007/0062696 A1 | | 3/2007 | Wilson et al. | |
| 2007/0199696 A1 | | 8/2007 | Walford | |
| 2008/0030739 A1 | | 2/2008 | Hartog et al. | |
| 2009/0097015 A1 | | 4/2009 | Davies | |

FOREIGN PATENT DOCUMENTS

EP 0298118 B1 1/1989

(Continued)

OTHER PUBLICATIONS

Maughan, Sally M., Huai H Kee, Trevor P Newson. Simultaneous distributed fibre temperature and strain sensor using microwave coherent detection of spontaneous Brillouin backscatter. Measurement Science and Technology; 2001, pp. 834-842, vol. 12, Institute of Physics Publishing.

(Continued)

*Primary Examiner* — Tarifur Chowdhury
*Assistant Examiner* — Isiaka Akanbi
(74) *Attorney, Agent, or Firm* — Brandon Clark; Rodney Wafford; Dan Hu (57) ABSTRACT

To measure a characteristic of a multimode optical fiber, a light pulse source produces a light pulse for transmission into the multimode optical fiber. A spatial filter passes a portion of Brillouin backscattered light from the multimode optical fiber that is responsive to the light pulse. Optical detection equipment detects the portion of the Brillouin backscattered light passed by the spatial filter.

23 Claims, 4 Drawing Sheets

FOREIGN PATENT DOCUMENTS

| | | | |
|---|---|---|---|
| EP | 1854959 | A1 | 11/2007 |
| EP | 1854959 | B1 | 7/2008 |
| GB | 2400906 | A | 10/2004 |
| GB | 2426331 | A | 11/2006 |
| GB | 2441552 | A | 3/2008 |
| GB | 2445364 | A | 7/2008 |
| WO | 8707014 | A2 | 11/1987 |
| WO | 2004001357 | A1 | 12/2003 |
| WO | 2005/106396 | A2 | 11/2005 |
| WO | 2007131662 | A1 | 11/2007 |
| WO | 2008035156 | A2 | 3/2008 |
| WO | 2008075238 | A1 | 6/2008 |
| WO | 2008081157 | A1 | 7/2008 |

OTHER PUBLICATIONS

Lees, Gareth P., Peter C Wait, Martin J Cole, Trevor P Newson. Advances in Optical Fiber Distributed Temperature Sensing Using the Landau-Placzek Ratio. IEEE Photonics Technology Letters, Jan. 1, 1998, pp. 126-128, vol. 10.

Feced R., T.R. Parker, M. Farhadiroushan, V. A. Handerek, A. J. Rogers. Power measurement of noise-initiated Brillouin scattering in optical fibers for sensing applications. Optics Letters Jan. 1, 1998, pp. 79-81, vol. 23, No. 1. 1998. Optical Society of America.

Kee, Huai H., Gareth P. Lees, Trevor P. Newson. All-fiber system for simultaneous interrogation of distributed strain and temperature sensing by spontaneous Brillouin scattering. Optics Letters, May 15, 2000, pp. 695-697, vol. 25, No. 10. 2000 Optical Society of America.

Wait, P. C. and A.H. Hartog, Spontaneous Brillouin-Based Distributed Temperature Sensor Utilizing a Fiber Bragg Grating Notch Filter for the Separation of the Brillouin Signal. IEEE Photonics Technology Letters, May 2001, pp. 508-510, vol. 13, No. 5. 2001 IEEE.

Alahbabi, M.N., Y.T. Cho, T. P. Newson. Simultaneous temperature and strain measurement with combined spontaneous Raman and Brillouin scattering. Optics Letters Jun. 1, 2005, pp. 1276-1278, vol. 30, No. 11. 2005 Optical Society of America.

Shimizu, Kaoru, Tsuneo Horiguchi, Yahei Koyamada, Toshio Kurashima. Coherent Self-Heterodyne Brillouin OTDR for Measurement of Brillouin Frequency Shift Distribution in Optical Fibers. Journal of Lightwave Technology, May 1994, pp. 730-736, vol. 12, No. 5. 1994 IEEE.

OFC 1998 Technical Digest, pp. 181-182.

* cited by examiner

MEASURING A CHARACTERISTIC OF A MULTIMODE OPTICAL FIBER

TECHNICAL FIELD

The invention relates generally to measuring a characteristic of multimode optical fiber that includes using a spatial filter to pass a portion of Brillouin backscattered light to optical detection equipment.

BACKGROUND

An optical time domain reflectometry (OTDR) system can be used to measure values of a physical parameter of interest along an optical fiber. In one application, the optical fiber can be deployed in a wellbore that is used to produce fluids from a reservoir in a subterranean structure, where the reservoir can include hydrocarbons, fresh water, or other fluids. Examples of physical parameters that may be of interest include temperature, strain, and other parameters. One type of OTDR system is the Brillouin OTDR system, which takes measurements based on Brillouin scattering.

Brillouin scattering is an inelastic phenomenon that results from the interaction of incident optical photons (of an incident optical signal) with acoustic phonons in the medium (the optical fiber) (Brillouin scattering occurs in media other than optical fibers). This interaction induces a counter-propagating optical wave (reflected or backscattered optical signal) having a frequency (Brillouin frequency) that is shifted from the frequency of the original incident optical wave. Brillouin scattering in an optical fiber is sensitive to both temperature and strain changes in the optical fiber.

Conventionally, Brillouin OTDR acquisition systems are designed to be used with single-mode optical fibers. The reason for the preference of single-mode optical fibers in conventional Brillouin OTDR systems stems from the relatively close frequency spacing between the Brillouin backscattered light and the probe pulse that is transmitted into the optical fiber, and the techniques used for separating probe and Brillouin signals are generally specific to, or more effective in, single-mode fibers than multimode fibres. However, requiring that Brillouin OTDR acquisitions be made with OTDR systems having single-mode optical fibers results in reduced flexibility of such OTDR systems.

SUMMARY

In general, according to an embodiment, an apparatus to measure a characteristic of a multimode optical fiber includes a light pulse source to produce a light pulse for transmission into the multimode optical fiber, and a spatial filter to pass a portion of Brillouin backscattered light from the multimode optical fiber that is responsive to the light pulse. Optical detection equipment is to detect the portion of the Brillouin backscattered light passed by the spatial filter.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

As used here, the terms "above" and "below"; "up" and "down"; "upper" and "lower"; "upwardly" and "downwardly"; and other like terms indicating relative positions above or below a given point or element are used in this description to more clearly describe some embodiments of the invention. However, when applied to equipment and methods for use in wells that are deviated or horizontal, such terms may refer to a left to right, right to left, or diagonal relationship as appropriate.

Techniques and apparatus are provided for measuring a characteristic (or multiple characteristics) of a multimode optical fiber according to optical time domain reflectometry (OTDR). More specifically, the OTDR technique employed with multimode optical fibers according to some embodiments is a Brillouin OTDR technique in which a spatial filter is provided between a multimode sensing optical fiber and optical detection equipment. The spatial filter is used to pass just a portion of Brillouin backscattered light received from the multimode optical fiber, where the Brillouin backscattered light is responsive to a light pulse transmitted into the multimode optical fiber by a light pulse source. The optical detection equipment is able to detect the portion of the Brillouin backscattered light passed by the spatial filter.

A Brillouin OTDR system according to some embodiments thus performs a Brillouin measurement on a multimode sensing optical fiber. Backscattered light emerging from a multimode sensing optical fiber generally occupies a number of modes with the result being that the phase of the backscattered light is non-uniform across the near-field of the optical fiber (i.e. light in the plane of the end of the optical fiber closest to the light source and optical detection equipment). Coherent light traveling in a multimode optical fiber produces an output that is speckle-like. While the modes of the multimode optical fiber are illuminated with light that is originally in phase, the difference in phase velocity between the modes of the multimode optical fiber causes the field patterns of these modes to interfere. As a result, bright and dark spots are observed that appear and fade in accordance with the relative phases of the modes. In turn, the relative phases of the modes vary depending on the state of the optical fiber (whether the optical fiber is bent, strained, heated, and so forth).

If a multimode sensing optical fiber is used, then filtering methods used in conventional Brillouin OTDR systems for selecting the Brillouin backscatter from other components of the scattered light spectrum and for determining the value of the frequency shift of the Brillouin backscattered are ineffective. However, in accordance with some embodiments, the backscattered light from the multimode optical fiber is passed through a spatial filter, such that the spatial distribution of the optical phase can be made consistent and the later stages of processing can work satisfactorily. The spatial filter includes an aperture that passes a sufficiently small portion of the speckle pattern (essentially a single speckle is passed) such that the phase across the aperture is uniform. More specifically, the light arriving at the aperture in many modes interferes at the aperture and the resultant transmitted light (the light passed through the spatial filter) is phase-coherent. One exemplary type of aperture is a single-mode optical fiber that performs the functions of an aperture while retaining the convenience of guided-wave optics. Another exemplary type of aperture is an opaque layer having an opening that can be provided at the end of the optical fiber.

Backscattered light passed through an appropriate spatial filter causes the spatial distribution of the optical phase to be made consistent so that a later processing stage can work satisfactorily. The later processing stage can include optical-filtering direct-detection equipment (shown in FIGS. 1 and 2 below) or coherent detection electronic equipment (shown in FIG. 5 below).

The ability to use a multimode optical fiber for Brillouin measurements enhances flexibility. For example, many Raman distributed temperature sensing (DTS) systems use multimode optical fibers. Raman DTS measurements are based on Raman scattering of light in an optical filter. By using techniques according to some embodiments, a Brillouin OTDR acquisition system can be used with existing Raman DTS systems that include multimode optical fibers.

Figure 1:
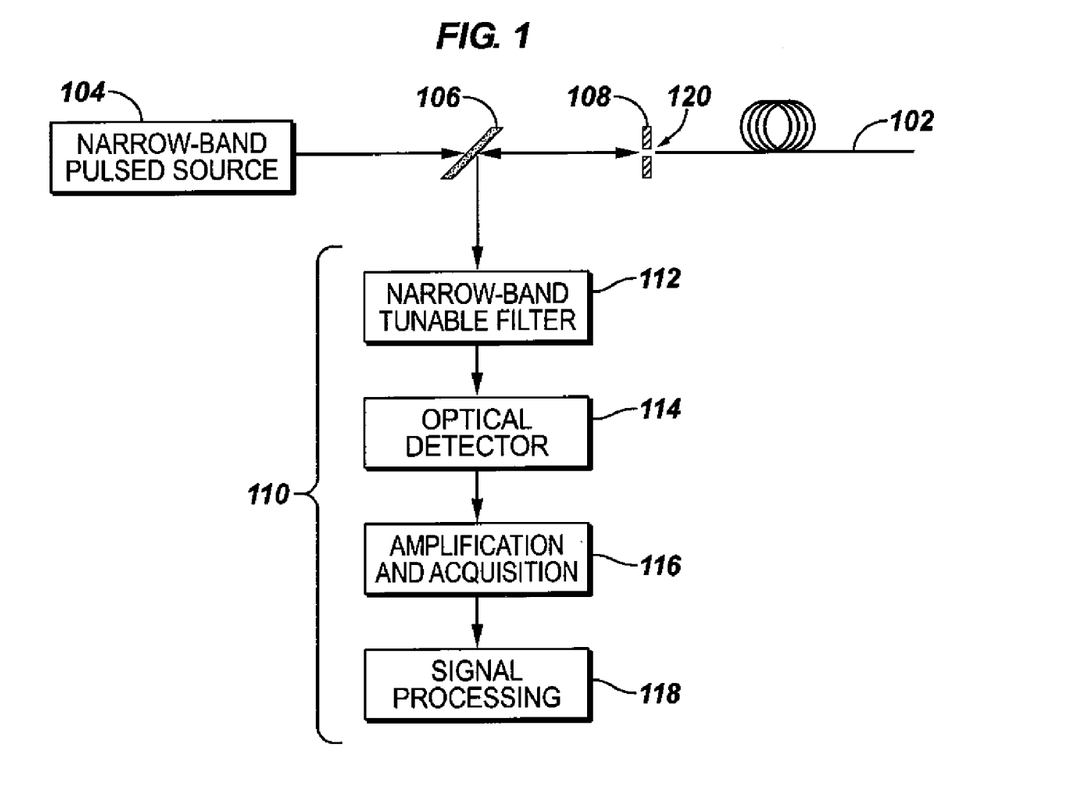
FIG. 1 illustrates a direct detection Brillouin optical time domain reflectometry (OTDR) system that uses a multimode sensing optical fiber, according to an embodiment.

FIG. 1 shows an exemplary arrangement of a Brillouin OTDR system that is used with a multimode sensing optical fiber 102. The multimode sensing optical fiber 102 can be positioned in a wellbore, for example, or positioned on land or in a marine environment. In the wellbore application, detecting a characteristic of the optical fiber is performed to determine a downhole condition, such as a downhole temperature or a strain applied to one or more points along the optical fiber by downhole equipment. In one implementation, the multimode sensing optical fiber 102 can be deployed in a wellbore that is used for producing target fluids from a reservoir, such as a hydrocarbon reservoir, a freshwater aquifer, and so forth. The multimode sensing optical fiber 102 when deployed in such a wellbore provides a distributed sensor that allows for detection of a parameter of interest. In this way, distributed temperature and/or strain measurements along the multimode optical fiber can be made, such as for diagnostic tests to verify integrity of optical fibers, or other applications. Strain and/or temperature measurement can also be performed with multimode optical fibers used in land-based or marine environments.

A Brillouin OTDR system measures the spontaneous Brillouin backscatter, which is the scattered signal that is proportional to the energy in the probe pulse (optical light pulse that is transmitted into the optical fiber). The Brillouin backscatter is typically concentrated in two narrow bands, one on either side of the frequency of the probe pulse. The shorter wavelength, higher frequency band is denoted as the anti-Stokes band, while the longer wavelength, lower frequency band is denoted as the Stokes band.

The Brillouin spectrum contains information about the strain on the optical fiber and the temperature of the optical fiber. The location associated with a detected characteristic is determined from the time elapsed between emission of the probe pulse and a time in which a particular sample of the backscatter was acquired. The frequency shift between the probe pulse and the Brillouin backscattered spectrum is known to vary with strain and temperature. Moreover, the intensity of the spontaneous backscattered light is also a function of temperature and strain. Therefore, a relation between temperature and strain to Brillouin frequency shift and intensity can be established.

FIG. 1 shows a direct detection Brillouin OTDR system that includes a narrow-band pulsed source 104 for launching a pulse of narrow band light into the multimode sensing optical fiber 102. The light pulse transmitted by the narrow-band pulsed source 104 is passed through an optical coupling device 106 for separating forward and backward light. "Forward" light refers to light transmitted from the source 104 to the optical fiber 102, while "backward" light refers to the backscattered light returned from the optical fiber 102. In one implementation, the optical coupling device 106 is a beamsplitter. Alternatively, the optical coupling device 106 can be a circulator, a fast switch, and so forth.

A spatial filter 108 according to some embodiments is provided between the optical fiber 102 and the source 104 and optical detection equipment 110. The backscattered light returned from the optical fiber 102 is passed through the spatial filter 108 to the optical coupling device 106, which directs the portion of the backscattered light passed through the spatial filter 108 to the optical detection equipment 110. The Brillouin backscattered light portion is sent to a narrow-band tunable optical filter 112, which is part of the optical detection equipment 110. The narrow-band tunable optical filter 112 is used to resolve the Brillouin frequency. Moreover, the tunable optical filter 112 can be tuned to cover the possible frequencies where the Brillouin signal may be found (typically a range of about 1 gigahertz (GHz) and a resolution of a few tens of megahertz (MHz) is used). After passing through the optical filter 112, the light is converted into an electrical signal by an optical detector 114 and passed to an acquisition and signal processing chain that includes an amplification and acquisition device 116 and a signal processing device 118.

Note that the arrangement of FIG. 1 is provided for purposes of example, as different implementations can use different configurations.

As discussed above, the spatial filter 108 that is positioned between the multimode sensing optical fiber 102 and the optical detection equipment 110 can be implemented in a number of ways. For example, the spatial filter 108 can be implemented with a single-mode optical fiber or an opaque layer with an opening. Additionally, the spatial filter 108 can be applied to either the far-field or the near-field. The near-field is a region that is very close to the proximal end 120 of the optical fiber (the end that is closest to the optical detection equipment 110). In the near field, the power distribution is still close to that prevailing within the optical fiber itself. In practice, "near field" means within a few microns of the optical fiber end 120. Equivalently, the optical fiber end phase can be imaged onto another surface, possibly with magnification, and the spatial filtering may then be applied to this second surface (the image plane), before the filtered light is allowed to progress further along the system.

Figure 3:
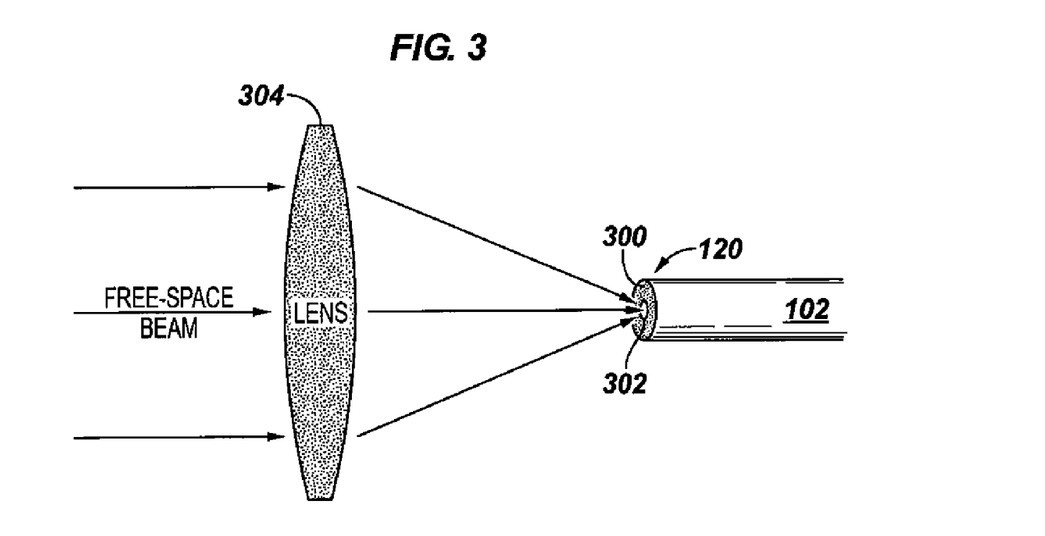
FIG. 3 illustrates an exemplary arrangement of a near-field spatial filter used in a Brillouin OTDR system according to an embodiment.

As depicted in FIG. 3, one way of creating a near-field spatial filter is to deposit a layer 300 of a light absorbing material ("opaque layer" 300) onto the end surface at the optical fiber end 120. A hole or opening 302 is then cut in this opaque layer 300, where the size of the hole is similar to the size of a speckle. The hole 302 can be cut, for example, using photolithographic techniques or laser ablation.

If the interrogation system (including the pulsed source 104 of FIG. 1) is formed from free-space optics, then the beam from the source 104 is focused, such as by using a lens 304, through this hole (generally with high efficiency) and thus launched into the multimode sensing optical fiber 102. In contrast, the backscattered light returning from the multimode sensing optical fiber 102 is generally distributed over a wide number of modes and thus only a fraction of that light is able to pass through the spatial filter formed from the combination of the opaque layer 300 and the hole 302.

Figure 2:
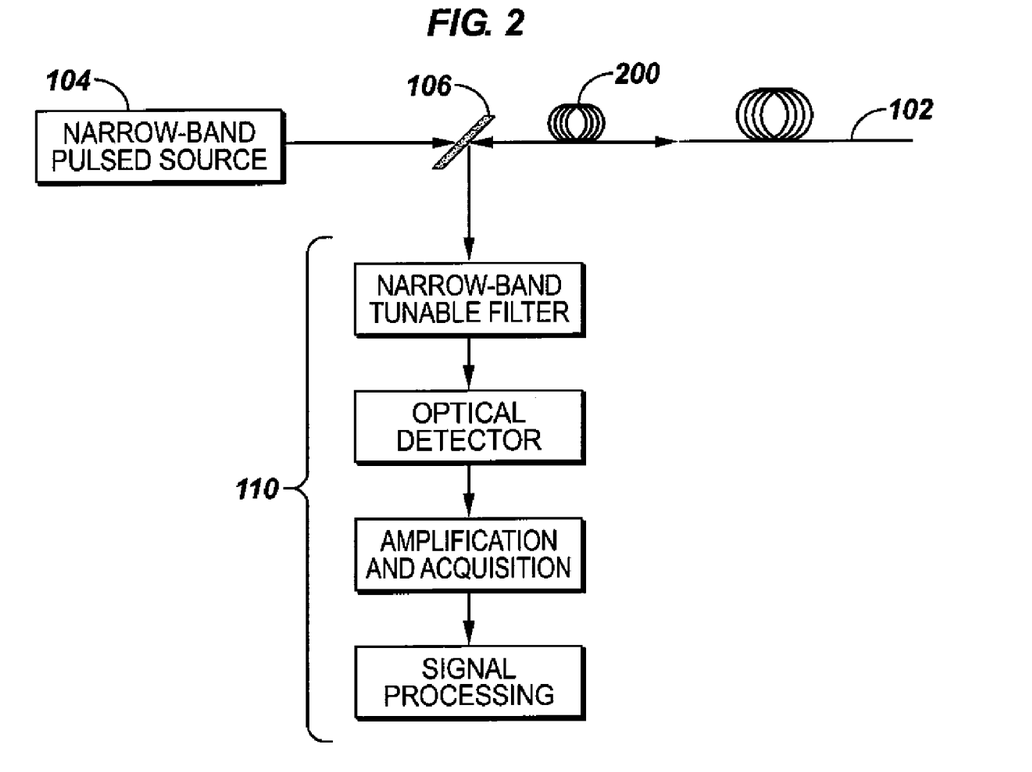
FIG. 2 illustrates a direct detection Brillouin optical time domain reflectometry (OTDR) system that uses a multimode sensing optical fiber, according to another embodiment.

An alternative implementation of a near-field spatial filter involves use of a single-mode optical fiber that is optically connected to the proximal end 120 of the optical fiber 102. Such an arrangement is depicted in FIG. 2, in which a single-mode optical fiber 200 is optically connected to the multimode sensing optical fiber 102. It is sufficient for a short path between the optics equipment (source 104, beamsplitter 106, and receiver 110) and the sensing optical fiber 102 to include a section of the single-mode fiber 200. The single-mode optical fiber 200 acting as a mode filter can be spliced to the sensing optical fiber 102 or coupled to the sensing optical fiber 102 using a fiber-fiber connector. The single-mode fiber 200 selects from among the speckles present in the backscattered signal. The selected speckle is in a region where the optical phase is consistent with its guided mode. All other light impinging on the single-mode optical fiber is not consistent with the guided mode and is thus rejected.

In using a single-mode optical fiber, the cladding modes (which do not meet the criteria required for guiding in the core) are removed. Cladding modes can be guided by the interface between the cladding and the outside of the fiber (coating or air). Cladding refers to the one or more layers of material of lower refractive index in contact with a core material of higher refractive index. For example, the cladding of an optical fiber can be an outer coating or the air surrounding the optical fiber, but in general includes also a layer of glass surrounding the core to provide a low-loss medium with an interface between of the core and the cladding that exhibits low interfacial scattering. Although these cladding modes are lossy, they can persist over short distances and can be troublesome. Optical fibers coated with a material having a higher refractive index than the cladding (usually silica) help by allowing the cladding modes to travel in the coating where they are generally heavily attenuated by absorption within the coating material. In general, a few (2-4 meters) of single-mode fiber with a higher index than silica (e.g., ultraviolet-curable acrylate) are sufficient to suppress the cladding modes to a sufficient degree and leave a single guided mode to travel in the core of the single-mode optical fiber.

Figure 4:
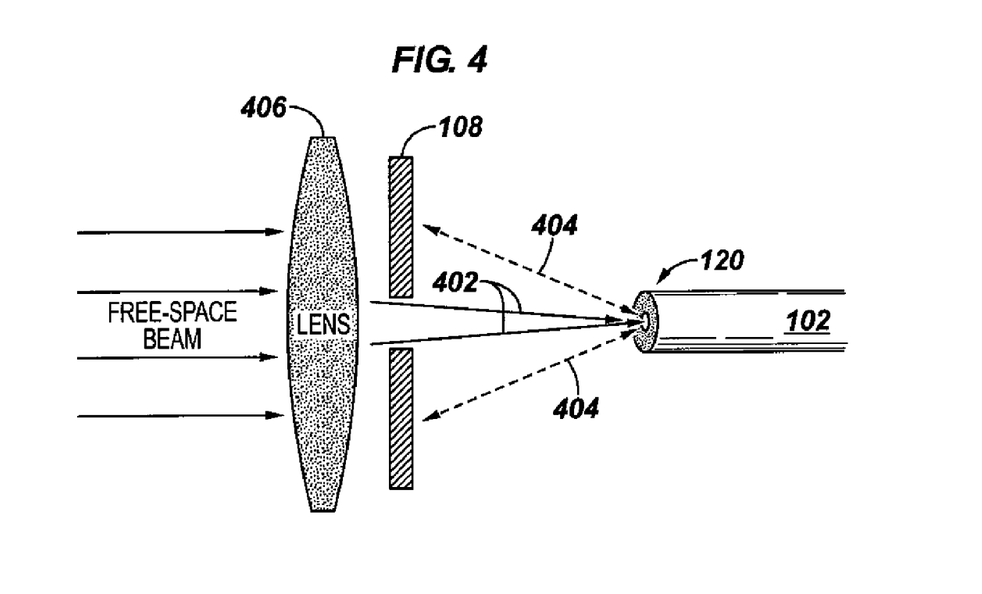
FIG. 4 illustrates a far-field spatial filter used in a Brillouin OTDR system according to an embodiment.

Instead of using a near-field spatial filter, a far-field spatial filter can be used instead. In a far-field spatial filtering approach, the backscattered light is allowed to diverge as it travels away from the end 120 of the sensing optical fiber 102. The diverging backscattered light is restricted by a spatial filter that selects a small solid angle. As depicted in FIG. 4, the light launched into the sensing optical fiber 102 is represented with solid arrows 402, whereas the light returning from the sensing optical fiber 102 is represented with dotted arrows 404. The light from the source 104 is assumed to originate from a single-mode laser that has a narrow beam and that passes efficiently through the aperture 108 behind a lens 406 that is positioned between the aperture 108 and the source 104. The light returning from the sensing optical fiber 102 is, however, more divergent (as indicated by the arrows 404) and the aperture 108 immediately prior to the lens 406 selects a narrow range of angles that are collimated and sent to the remainder of the system (optical coupling device 106) and optical detection equipment 110).

Note that the near-field and far-field approaches are functionally equivalent, but depending on the details of the OTDR equipment, one may be more convenient than the other.

As noted above, each speckle point will fade as the relative phase of the modes of the multimode sensing optical fiber is varied under the influence of environmental conditions. Moreover, the selection of a single speckle rejects light that is not within that speckle, and thus decreases the signal strength. This degradation in the signal quality can be alleviated by using multiple apertures (e.g., a spatial filter implemented with an opaque layer having multiple holes, or a spatial filter with multiple single-mode optical fibers), each selecting a single speckle. The light passed by each aperture is then processed independently (by optical or coherent detection/electronic filtering). The results are then combined after the detection process or later in the signal processing chain.

Figure 5:
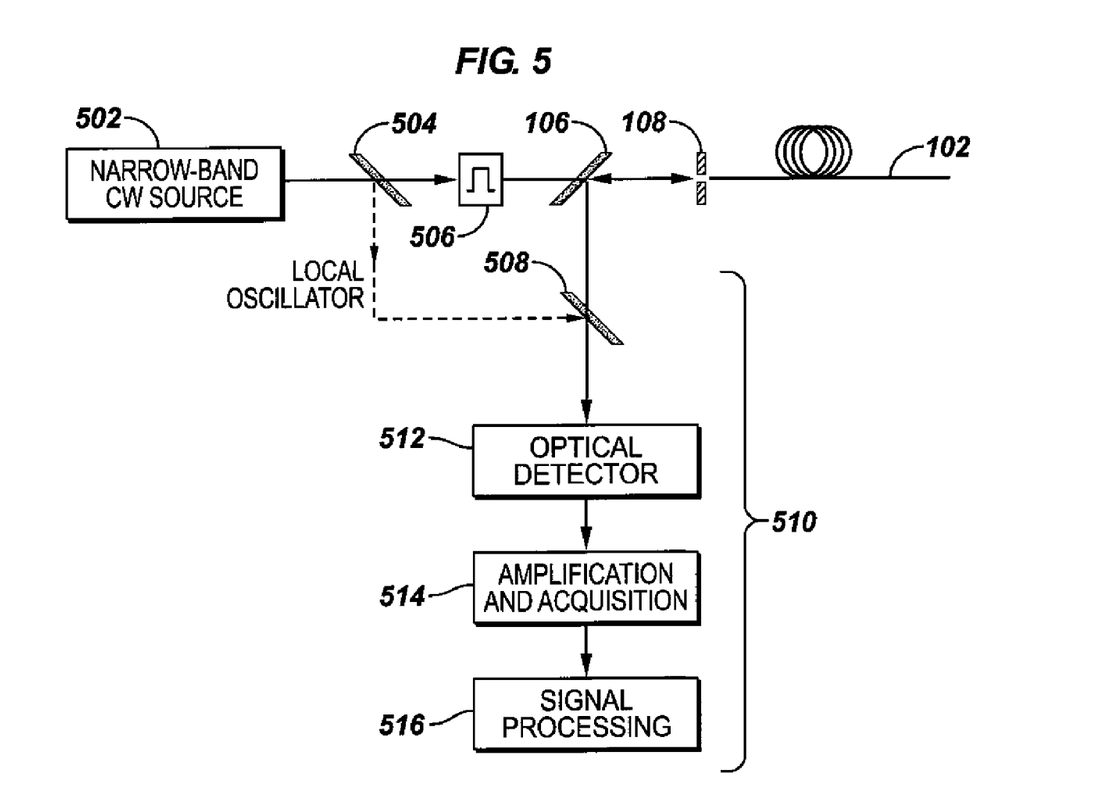
FIG. 5 illustrates a coherent detection Brillouin OTDR system that uses a multimode sensing optical fiber, according to another embodiment.

FIG. 5 shows a coherent detection Brillouin OTDR system, according to another embodiment. Here, the arrangement of the optical coupling device 106, spatial filter 108, and multimode sensing optical fiber 102 is similar to that in FIG. 1. However, in FIG. 5, the light source is a narrow-band continuous wave source 502. The output of the narrow-band continuous wave source 502 is split by an optical coupling device 504 into a first path and a second path. The first path contains a modulator 506 (that also may contain an optical amplifier), which provides light through the optical coupling device 106 and spatial filter 108 to the sensing optical fiber 102. The second path from the optical coupling device 504 leads a fraction of the source output (the optical local oscillator) to a beam combiner 508. The optical local oscillator produces light under control of a user or operator for mixing with received light (in this case, Brillouin backscattered light from the sensing optical fiber 102). The beam combiner 508 combines the backscattered light portion (that has been passed through the spatial filter 108) with the local oscillator light into a combined light, which is provided to an optical detector 512. The output of the optical detection is passed to a chain that includes an amplification and acquisition device 514 and signal processing device 516. The combination of elements 508, 114, 116, and 118 in FIG. 5 make up the optical detection equipment 510 of the coherent detection Brillouin OTDR system depicted in FIG. 5.

The optical detector 512 is responsive to the square of the electrical field. As a result, various mixing terms are generated, including one at the difference frequency, which is equal to the Brillouin frequency. A number of variants are possible, such as frequency-shifting either the pulsed light or the local oscillator in order to change the frequency at which the Brillouin signal appears. The electrical signal generated in the detector can be processed in a number of ways, the most common being a further mixing stage.

In some cases, it may be desirable to measure Raman and Brillouin backscatter on the same multimode sensing optical fiber 102. This is the case, for example, where a multimode optical fiber has been installed for temperature sensing, but an unplanned event, such as damage to the structure or cable, makes it desirable to be able to determine the strain on the temperature-sensing optical fiber.

Figure 6:
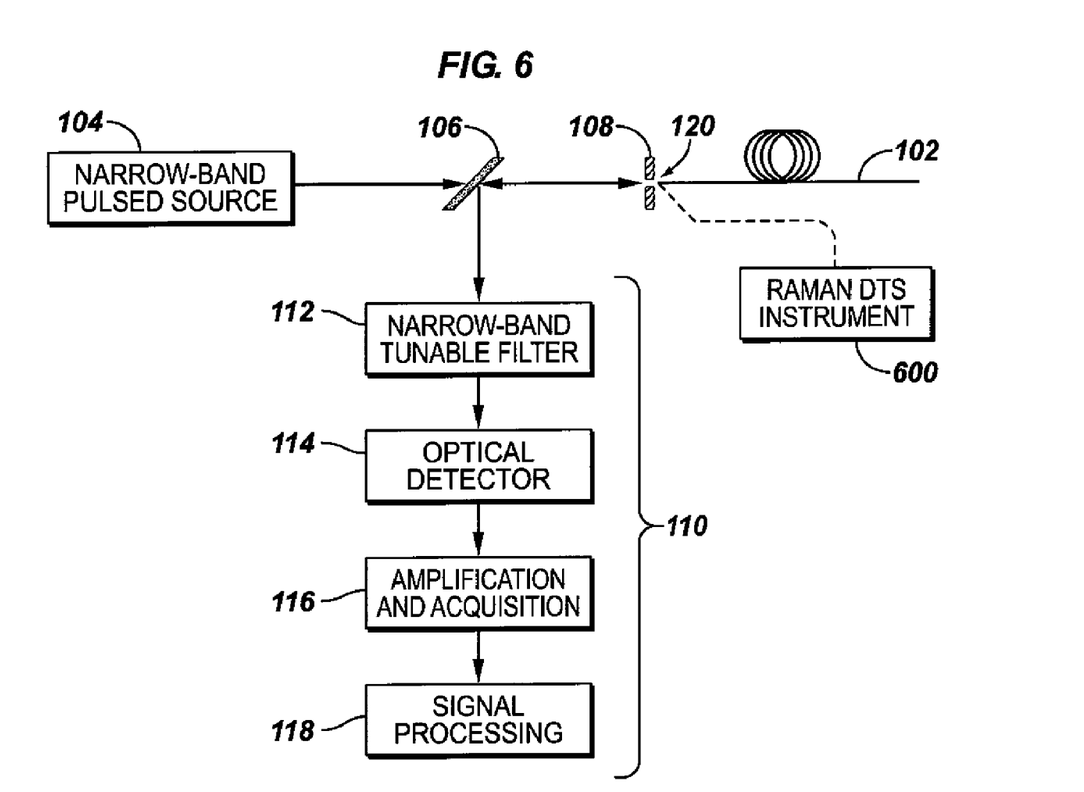
FIG. 6 illustrates an OTDR system that includes both Brillouin and Raman measurement equipment, according to a further embodiment.

In this case, the arrangement of FIG. 1, 2, or 5 can be complemented by adding equipment to perform Raman measurement. For example, FIG. 6 shows a Raman DTS instrument coupled to the end 120 of the multimode sensing optical fiber 102. Options for adding measurement of Raman backscatter include adding a switch (or, if the distributed temperature system works at a different wavelength from the BOTDR system, a wavelength-division multiplexer). Alternatively, the Brillouin and Raman signals resulting from scattering from pulses obtained from the same source can be separated after they are re-directed by the beamsplitter (optical coupling device 106 in FIGS. 1, 2, and 5).

The following lists some of the applications of some embodiments of the invention. In energy cables (such as cables to carry electricity), optical fibers may be installed within or attached to the electrical cables to monitor their temperature profile. The electrical cables can be installed in the ground or in the air. Some embodiments of the invention enable for strain and temperature to be detected for such optical fibers that have been installed in or attached to electrical cables. Strain may be of interest in regions of subsidence (e.g., in areas where mining has been active) or to detect displacement of subsea cable, such as a result of disturbance by anchors or stormy weather.

As noted above, sensing optical fibers can also be provided in wells to perform distributed temperature sensing to derive information on steam or water injection or the location of produced fluid inflow. The optical fibers can be inserted into a tube or control line.

Insufficient or excessive lengths of the optical fiber compared with the tube length can result in strain being applied to the optical fiber, which can be detected using some embodiments of the invention. In addition, distortion of the wellbore or other parts of the toolstring can lead to unplanned strain being applied to the sensing optical fiber.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. An apparatus to measure a characteristic of a multimode optical fiber, comprising:
   a light pulse source to produce a light pulse for transmission into the multimode optical fiber;
   an optical local oscillator to produce light;
   a spatial filter to pass a portion of Brillouin backscattered light from the multimode optical fiber that is responsive to the light pulse;
   a beam combiner to combine the light from the optical local oscillator and the Brillouin backscattered light portion into a combined light; and
   optical detection equipment to detect the combined light.

2. The apparatus of claim 1, wherein the spatial filter includes an aperture to pass a portion of a speckle pattern generated by the multimode optical fiber.

3. The apparatus of claim 1, wherein the spatial filter includes a single-mode optical fiber.

4. The apparatus of claim 1, wherein the spatial filter includes an opaque layer with a hole in the opaque layer, and wherein the opaque layer is provided on an end surface of the multimode optical fiber.

5. The apparatus of claim 1, wherein the spatial filter is a near-field spatial filter connected to a proximal end of the multimode optical fiber.

6. The apparatus of claim 1, wherein the spatial filter is a far-field spatial filter that is spaced apart from the proximal end of the multimode optical fiber.

7. The apparatus of claim 1, wherein the spatial filter has plural apertures to select plural respective speckles from the Brillouin backscattered light.

8. The apparatus of claim 1, further comprising Raman detection equipment to process Raman backscattered light from the multimode optical fiber.

9. The apparatus of claim 1, wherein the spatial filter is positioned between the multimode optical fiber and the optical detection equipment.

10. The apparatus of claim 9, further comprising an optical coupling device to:
    direct the light pulse from the light pulse source to the multimode optical fiber; and
    direct the portion of the Brillouin backscattered light passed by the spatial filter to the optical detection equipment.

11. The apparatus of claim 1, wherein the optical detection equipment includes a signal processing device to determine the characteristic of the multimode optical fiber.

12. The apparatus of claim 11, wherein the determined characteristic includes at least one characteristic selected from among temperature and strain of the multimode optical fiber.

13. The apparatus of claim 1, further comprising an optical coupling device to split the light pulse into first and second light signal portions, the first light signal portion for transmission into the multimode optical fiber, and the second light signal portion providing the optical local oscillator.

14. A method of measuring a characteristic of a multimode optical fiber, comprising:
    transmitting a light pulse into the multimode optical fiber;
    providing a local oscillator light signal;
    passing Brillouin backscattered light from the multimode optical fiber that is responsive to the light pulse through a spatial filter, wherein a portion of the Brillouin backscattered light is passed through the spatial filter;
    combining the local oscillator light signal with the Brillouin backscattered light portion to form a combined light signal; and
    directing the combined light signal to optical detection equipment for processing.

15. The method of claim 14, wherein passing the Brillouin backscattered light through the spatial filter comprises passing the Brillouin backscattered light through an aperture that passes a portion of a speckle pattern generated by the multimode optical fiber.

16. The method of claim 14, wherein passing the Brillouin backscattered light through the spatial filter comprises passing the Brillouin backscattered light through a single-mode optical fiber.

17. The method of claim 14, wherein passing the Brillouin backscattered light through the spatial filter comprises passes the Brillouin backscattered light through an opening of an opaque layer provided on an end surface of the multimode optical fiber.

18. The method of claim 14, further comprising deploying the multimode optical fiber in a well.

19. The method of claim 14, further comprising deploying the multimode optical fiber along an electrical cable.

20. A system comprising:
    a multimode optical fiber;
    a light pulse source to produce a light pulse for transmission into the multimode optical fiber;
    an optical local oscillator to produce light;
    a spatial filter to pass a portion of Brillouin backscattered light from the multimode optical fiber that is responsive to the light pulse;
    a beam combiner to combine the light from the optical local oscillator and the Brillouin backscattered light portion into a combined light; and
    optical detection equipment to detect the combined light.

21. The system of claim 20, wherein the spatial filter includes a single-mode optical fiber that is connected to the multimode optical fiber, wherein the single-mode optical fiber is positioned between the multimode optical fiber and the optical detection equipment.

22. The system of claim 20, wherein the spatial filter includes an opaque layer with a hole in the opaque layer, wherein the opaque layer is provided on an end surface of the multimode optical fiber.

23. The system of claim 20, further comprising an optical coupling device to split the light pulse into first and second light signal portions, the first light signal portion for transmission into the multimode optical fiber, and the second light signal portion providing the optical local oscillator.

* * * * *